United States Patent
Rousseau et al.

(10) Patent No.: US 6,419,455 B1
(45) Date of Patent: Jul. 16, 2002

(54) SYSTEM FOR REGULATING PRESSURE IN A VACUUM CHAMBER, VACUUM PUMPING UNIT EQUIPPED WITH SAME

(75) Inventors: Claude Rousseau, Annecy; Patrick Pilotti, Cran-Gevrier; Philippe Maquin, St Jean de Sixt, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/700,917

(22) PCT Filed: Apr. 7, 2000

(86) PCT No.: PCT/FR00/00886
§ 371 (c)(1),
(2), (4) Date: Nov. 21, 2000

(87) PCT Pub. No.: WO00/60428
PCT Pub. Date: Oct. 12, 2000

(30) Foreign Application Priority Data

Apr. 7, 1999 (FR) .............................................. 99 04347
Apr. 12, 1999 (FR) .............................................. 99 04539

(51) Int. Cl.⁷ .............................................. F04B 49/00
(52) U.S. Cl. ............................ 417/36; 417/2; 417/44.2; 417/244; 417/426
(58) Field of Search .......................... 417/2, 244, 426, 417/44.2, 36, 4, 5, 6

(56) References Cited

U.S. PATENT DOCUMENTS

| | | | | |
|---|---|---|---|---|
| 4,699,570 A | * | 10/1987 | Bohn ............................. | 417/6 |
| 4,887,940 A | * | 12/1989 | Crinquette et al. ............. | 417/2 |
| 4,887,941 A | * | 12/1989 | Crinquette et al. ............. | 417/2 |
| 5,039,280 A | * | 8/1991 | Saulgeot et al. ............. | 417/205 |
| 5,165,864 A | * | 11/1992 | Burger et al. ................ | 417/244 |
| 5,586,159 A | * | 12/1996 | Kitaoka et al. ................ | 378/34 |
| 5,746,581 A | * | 5/1998 | Okumura et al. ............... | 417/2 |
| 5,849,135 A | * | 12/1998 | Selwyn ........................ | 156/345 |
| 5,971,711 A | * | 10/1999 | Noli et al. ...................... | 417/2 |
| 6,022,195 A | * | 2/2000 | Gaudet et al. ................. | 417/27 |
| 6,045,332 A | * | 4/2000 | Lee et al. ........................ | 417/5 |
| 6,131,588 A | * | 10/2000 | Kamikawa et al. ....... | 134/102.3 |

FOREIGN PATENT DOCUMENTS

| | | |
|---|---|---|
| DE | 262 065 A1 | 11/1988 |
| JP | 0690235 A2 * | 1/1996 |
| WO | WO 99/04325 | 1/1999 |

OTHER PUBLICATIONS

Patent Abstracts of Japan, vol. 10, No. 304 (M–626), Oct. 16, 1986 corresponding to JP 61 116081 A (Toshiba Corp.) Jun. 3, 1986.

* cited by examiner

Primary Examiner—Charles G. Freay
Assistant Examiner—Han Liu
(74) Attorney, Agent, or Firm—Sughrue Mion, PLLC

(57) ABSTRACT

The invention relates to a system for regulating the pressure in an enclosure (1) that is to contain processed gas for manufacturing semiconductor components or micro- or nano-technology devices, the enclosure being connected by pipework (2) to a pump unit (3) comprising a dry mechanical primary pump (4) and at least one secondary pump (5). According to the invention, the system further comprises a speed controller (6) controlling simultaneously the speeds of rotation of the dry mechanical primary pump (4) and of said at least one secondary pump (5).

25 Claims, 4 Drawing Sheets

SYSTEM FOR REGULATING PRESSURE IN A VACUUM CHAMBER, VACUUM PUMPING UNIT EQUIPPED WITH SAME

BACKGROUND OF THE INVENTION

The present invention relates to a system for regulating pressure in a process enclosure or chamber pumped by a vacuum pump unit for manufacturing and treatment processes concerning semiconductor components or micro- or nano-technology devices.

In industrial processes for manufacturing and treatment of such products in process chambers or enclosures fed with treatment gas at very low pressures, it is necessary to regulate the pressure inside the enclosure. Very low pressures, of the order of 1 Pa to 20 Pa, are obtained and maintained by a vacuum system which generally comprises a pump unit (a primary pump and a secondary pump) and pipework for connecting the process chamber to the pump unit.

There are numerous contamination problems in the various processes for manufacturing semiconductors or micro- or nano-technology devices. Some relate to the vacuum system which extracts gas from the process chambers and more precisely they relate to pumping conditions. A system for regulating pressure in the enclosure containing the manufacturing substrate (the process chamber) ought to provide a solution to some of this contamination.

When a chamber is pumped out, the gas in the chamber expands, thereby causing the gas to cool. If the pressure is lowered too quickly, then the temperature of the gas drops and a phase change is initiated (gas→liquid, gas→solid). Droplets or particles form in the pipework and in the chamber (on the substrate). They can diffuse back from the pipework into the chamber and thus increase contamination of the chamber.

If pressure is lowered quickly, then turbulent motion is generated. Such turbulent structures tear away particles that have been deposited in the pipework and the chamber, transports them, and redistributes them in zones that can be critical (on substrates where integrated circuits are being made).

A known method of regulating pressure in an enclosure being pumped out by a vacuum pump is to use a valve of variable conductance in series with the suction of the pump thus making it possible to vary the flow that is pumped and hence the pressure in the enclosure. The extent to which the valve is opened is adjusted by the control signal coming from a regulator circuit operating on the basis of a reference pressure and of the pressure measured in the enclosure.

That structure with a variable conductance valve is expensive and bulky.

In addition, the regulator valve positioned immediately at the outlet from the chamber to regulate pressure in the chamber at given gas flow rates nevertheless presents a large surface area for receiving deposits of particles generated by the processes and also by any degassing and desorption. By back-diffusion, desorbed particles can in turn contaminate the process chamber, thus reducing the reliability of the process. The presence of the valve increases and complicates maintenance operations in which it is necessary periodically to clean the vacuum system to remove deposits of particles generated by the processes.

The variable conductance valve also presents inevitable mechanical inertia which increases the reaction time of the vacuum system. In practice, a vacuum system having a variable conductance valve has a reaction time of at least about 5 seconds to cause the pressure in the process chamber to pass from one value to another in the usual pressure range of 1 Pa to 20 Pa between two steps in the process.

Another known method is to use a mechanical primary pump whose speed of rotation is variable and servo-controlled to a pressure gauge. However, the range of pumping flow rates that can be controlled is too restricted for semiconductor applications. As a result, at high vacuums, pressure regulation is not effective and contamination can develop.

In the field of semiconductor manufacture, document DD 262 065 A teaches using a vacuum system comprising a primary pump followed by two Roots type secondary pumps in series. The primary pump is a rotary vane pump driven to rotate at constant speed. The Roots secondary pumps are controlled by a microcontroller via variable frequency power supplies to modulate their speeds of rotation and thus to vary the pressure in the process chamber. The document states that this makes it possible to vary pressure over a range of 10 Pa to 100 Pa. The system is not suitable for providing effective control over pressure in a pressure excursion range going up to atmospheric pressure, and it does not enable reaction times to be obtained that are shorter than those obtained by vacuum systems having variable conductance valves.

SUMMARY OF THE INVENTION

One of the objects of the present invention is to increase significantly the range of controllable pumping rates in order to be able to regulate pressure over all process steps in semiconductor and micro- or nano-technology applications.

Another object of the present invention is to increase the reaction speed of the pumping system during transitions between successive process steps. In particular, it is desired to obtain reaction times that are clearly shorter than those of vacuum systems having variable conductance valves.

To this end, the invention relates to a system for regulating the pressure in an enclosure that is to contain process gas for manufacturing semiconductor components or micro- or nano-technology devices, the enclosure being connected by pipework to a pump unit comprising a dry mechanical primary pump and at least one secondary pump;

according to the invention, the system comprises a speed controller controlling simultaneously the speeds of rotation both of the dry mechanical primary pump and of said at least one secondary pump.

In an embodiment of the invention, the speed controller is servo-controlled to predetermined rotary speed profiles for the pumps calculated on the basis of condensation curves for the effluents contained in the enclosure and the pipework.

Advantageously, on its own or in combination with the condensation curves, the speed controller can also be servo-controlled to predetermined rotary speed profiles for the pumps, calculated on the basis of aerodynamic characteristics for non-turbulent flow of the effluents in the enclosure and the pipework.

In another embodiment of the invention, the system comprises:
 a pressure gauge mounted upstream from the controlled secondary pump to monitor pressure; and
 an observer receiving an input value proportional to the monitored pressure and an input value proportional to a variable reference pressure, and outputting a control signal to the speed controller to increase or decrease the speeds of rotation of the pumps as a function of its input values.

Advantageously, the system may comprise a temperature probe mounted upstream from the controlled secondary pump to monitor temperature, the observer receiving an input value proportional to the monitored temperature.

In addition, the system may comprise a turbulence sensor mounted upstream from the controlled secondary pump to quantify the degree of turbulence, the observer having an input value proportional to the quantified degree of turbulence.

The invention also relates to vacuum pumping apparatus comprising a pump unit having a dry mechanical primary pump and at least one secondary pump, a vacuum enclosure, and pipework connecting the vacuum enclosure to the pump unit.

According to the invention, the pump apparatus comprises a pressure regulator system as described above.

The secondary pump, controlled simultaneously with the dry primary pump, may be a turbomolecular pump.

The secondary pump, controlled simultaneously with the dry primary pump, may be a Roots type pump. In which case, a turbomolecular pump can be interposed between the controlled Roots type secondary pump and the regulated pressure enclosure or process chamber.

One of the advantages of the present invention results from simultaneously servo-controlling the primary pump and at least one secondary pump in the pump unit. This makes it possible to obtain a controllable pumping flow rate range covering 10 sccm to 10,000 sccm (0.16 millibar liters per second (mbar l/sec) to 166 mbar l/s) covering the needs of semiconductor applications. This also makes it possible to reduce significantly the reaction time of the vacuum system.

In a particularly advantageous embodiment, the observer is programmed to produce a variable speed control signal which, on receiving a step in reference value, presents a reaction time of less than 5 seconds and an overshoot of less than 5% during steps in the treatment of semiconductors or micro- or nano-technology devices in the enclosure.

For example, the observer is programmed to act via an open loop during the transient step of the process, and to act via a closed loop during steady conditions of the process.

This considerably reduces the reaction time of the system, enabling it to react considerably faster than is possible with vacuum systems including a variable conductance valve.

BRIEF DESCRIPTION OF THE DRAWINGS

Other advantages and characteristics of the present invention can be seen from the following description given with reference to the accompanying drawings, in which.

DETAILED DESCRIPTION OF THE INVENTION

Figure 1:
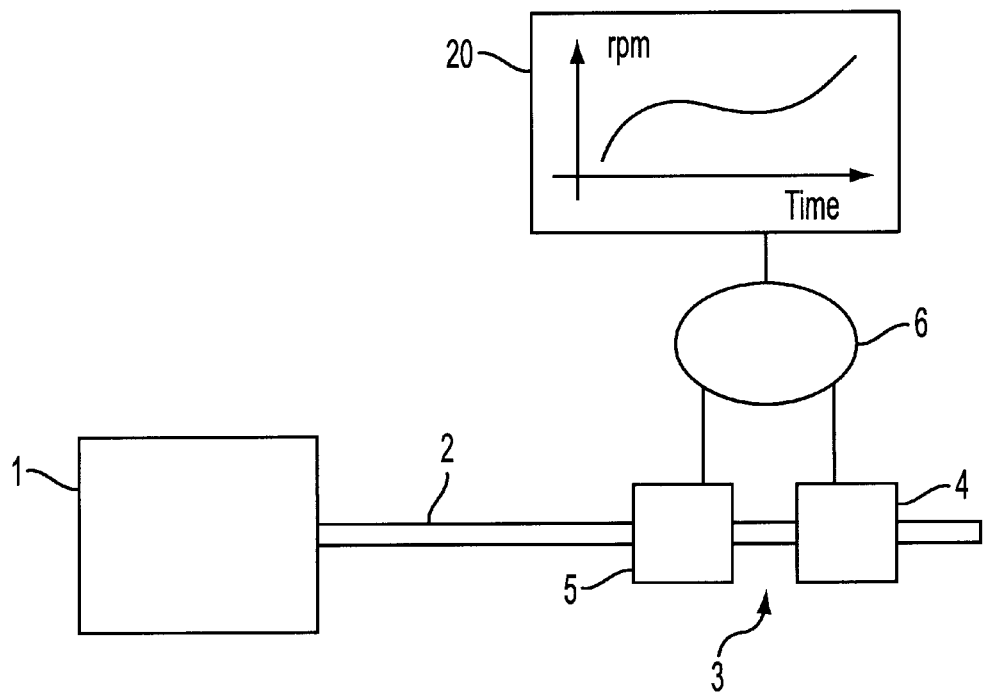
FIG. 1 is a diagram of a system constituting an embodiment of the invention.

The invention relates to a system for regulating pressure in a process chamber or enclosure 1 connected by pipework 2 to a pump unit 3 comprising a dry mechanical primary pump 4 and at least one secondary pump 5. The process chamber or enclosure 1 is designed to be fed with treatment gas at low pressure appropriate for manufacturing and treating semiconductor components and micro- or nano-technology devices.

The system includes a variable speed controller 6 simultaneously controlling the speeds of rotation both of the dry mechanical primary pump 4 and of the secondary pump 5.

In a first embodiment, as shown in FIG. 1, the speed controller 6 is servo-controlled to predetermined rotary speed profiles 20 for the pumps, which profiles are determined on the basis of condensation curves for the effluents contained in the enclosure 1 and the pipework 2.

Figure 4A:
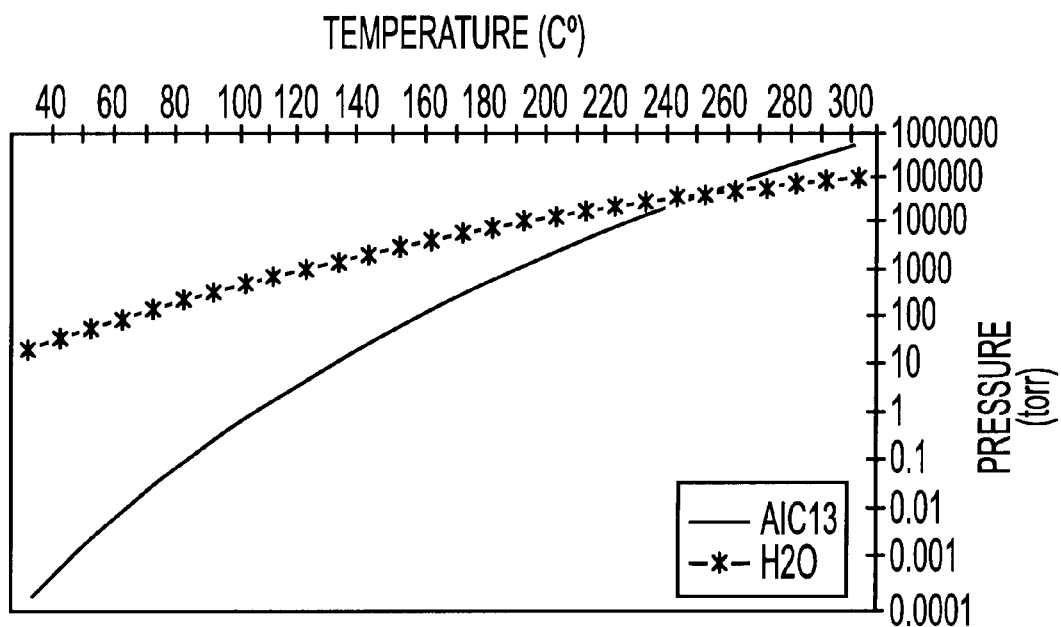
FIGS. 4A and 4B are graphs applying to two potential effluents ($H_2O$ and $AlCl_3$) respectively giving condensation curves and the resulting predetermined rotary speed profiles.
Figure 4B:
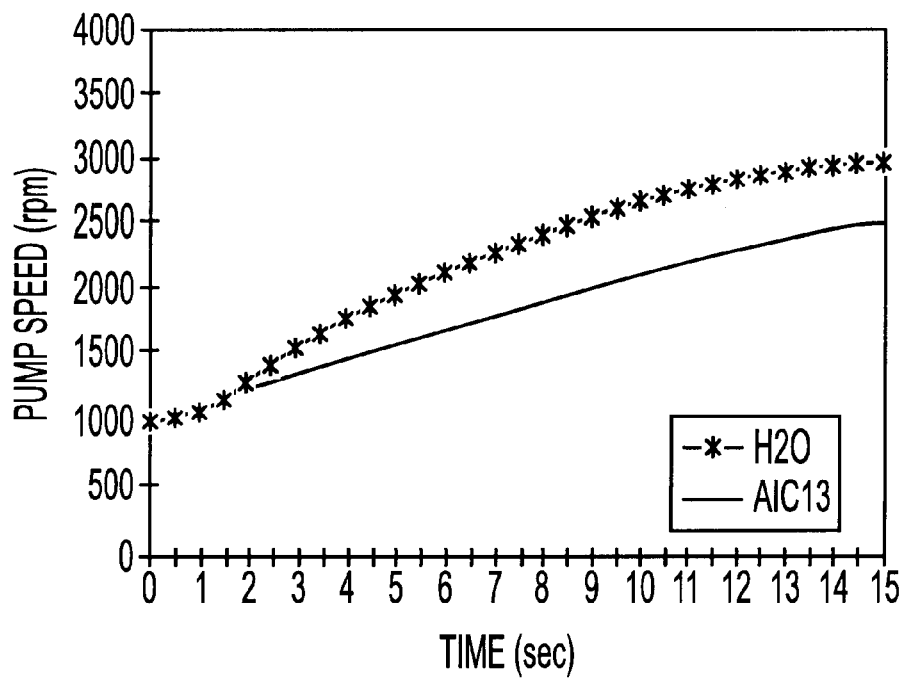

FIGS. 4A and 4B relate to two effluents ($H_2O$ and $AlCl_3$) and for those two effluents they show respectively condensation curves and rotary speed profiles for the pumps that are predetermined to avoid any condensation of said effluents. The effluents $H_2O$ and $AlCl_3$ are given here as illustrative examples in the first embodiment of the invention and they are not limiting in any way. The predetermined speed profiles shown in FIG. 4B are simple in that each of them relates to a single effluent. It will be understood that these profiles can be much more complicated when the enclosure 1 contains a plurality of effluents having different condensation curves.

In order to avoid contaminating deposits being released from the walls of the enclosure 1 and/or the pipework 2, the predetermined rotary speed profiles for the pumps can be calculated so as to take account of the non-turbulent aerodynamic flow characteristics of the effluents in the enclosure 1 and the pipework 2. Thus, the predetermined rotary speed profiles take account of the fact that effluent flow resulting from pumping must remain as much as possible in the laminar range.

The secondary pump which is controlled simultaneously with the primary pump can be a molecular drag or "turbomolecular" pump.

The secondary pump which is controlled simultaneously with the primary pump, can also be a Roots type pump. Under such circumstances, a turbomolecular pump can be interposed between the controlled Roots type secondary pump and the regulated pressure enclosure.

Figure 2:
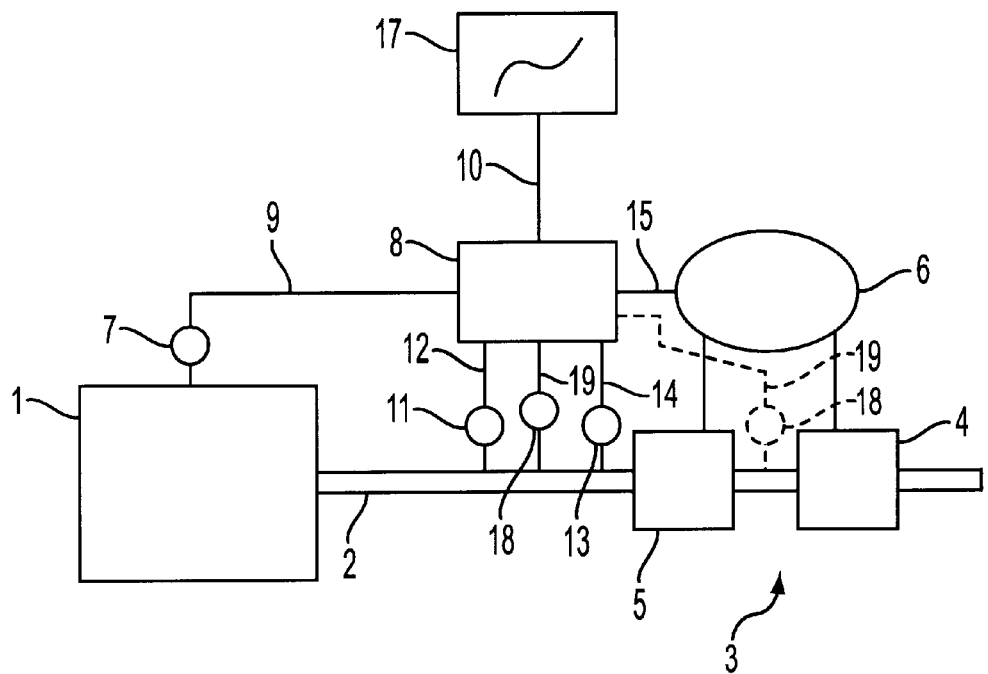
FIG. 2 is a diagram of a system constituting another embodiment of the invention.

In a second embodiment shown in FIG. 2, the system has a pressure gauge 7 mounted upstream from the controlled secondary pump 5 to sense pressure; and an observer 8 having inputs that receive a value 9 which is proportional to the sensed pressure and a value 10 which is proportional to a variable reference pressure 17, and outputting a control signal 15 for the speed controller 6 to increase or decrease the speeds of rotation of the pumps as a function of its input values 9 and 10.

In order to refine the control of the speed of rotation of the pumps to optimum conditions limiting contamination by condensation of effluents contained in the enclosure 1 or the pipework 2, the system further includes a temperature probe 11 mounted upstream from the controlled secondary pump 5 to monitor temperature. The observer 8 receives an additional input value 12, said value 12 being proportional to the monitored temperature.

In order to enable the servo-control loop to limit contamination due to contaminating deposits being released because the flow of pumped effluent is too turbulent, the system includes a turbulence sensor 13 mounted upstream from the controlled secondary pump 5 for quantifying the degree of turbulence. The observer 8 receives an additional input value 14 which is proportional to the quantified degree of turbulence.

The system can also include a particle sensor 18 mounted upstream and/or downstream of the controlled secondary pump 5 for measuring a particle level, the observer 8 receiving an input value 19 proportional to the number of particles in the pipework 2.

Figure 3:
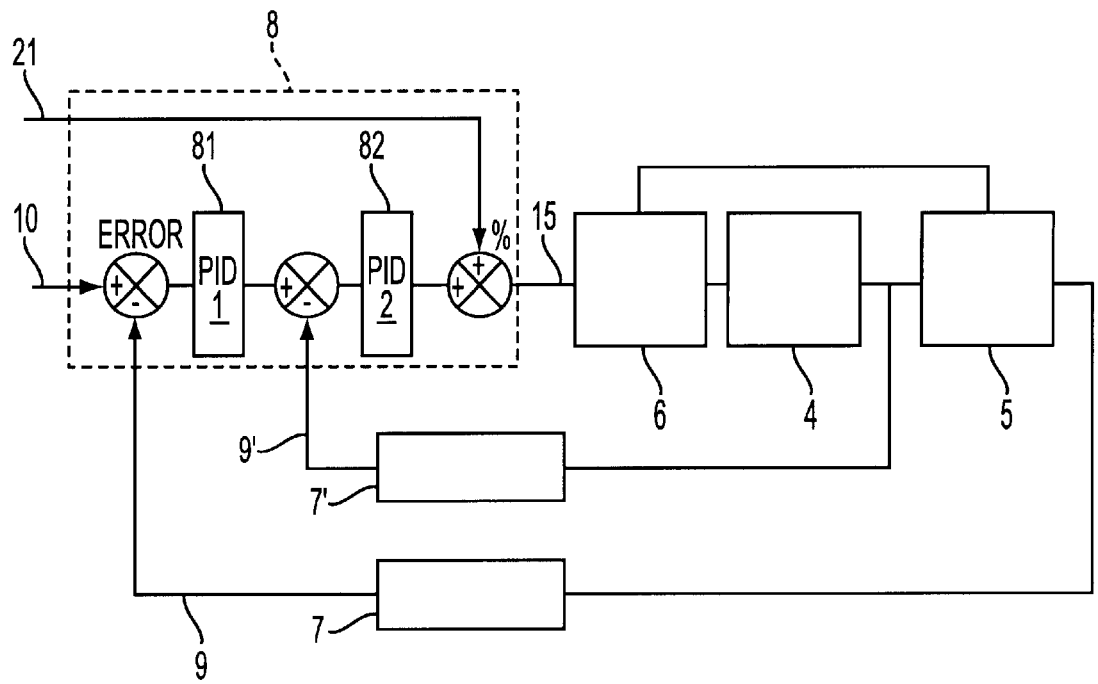
FIG. 3 is a diagram of a system constituting another embodiment of the invention.

In another embodiment of the invention, as shown in FIG. 3, there can be found the observer 8 which controls the speed controller 6 which in turn powers separately and at variable frequency both the dry primary pump 4 and at least one secondary pump 5. The system includes a pressure gauge 7' mounted upstream from the dry primary pump 4 in addition to the pressure gauge 7 mounted upstream from the secondary pump 5. The observer 8 implements a first algorithm 81, e.g. a PID algorithm for regulating the pressure 91 at the intake of the dry primary pump 4 and optimizing the response time of the pressure 9 at the intake of the secondary pump 5, and a second algorithm 82, e.g. a second PID algorithm, which regulates the pressure 9 at the intake of the secondary pump 5 to optimize static error and instability under steady conditions. To reduce the duration of a transient between an initial pressure state and a reference 10 for a final pressure state, the regulator loop has added thereto a reference 21 which is set close to the final reference speed (stabilized process); this makes it possible to diminish the delaying effect of the integral portion of the PID algorithms.

In another embodiment of the invention (not shown), the system includes a pressure gauge mounted upstream from the controlled primary pump, and/or a pressure gauge mounted upstream from the secondary pump. The speed controller or the observer contains an automation card which ensures optimum transit (as short as possible) between an initial pressure state of the chamber (and thus of the speeds of rotation of the pumps) and a final pressure state in the chamber.

This automation card can include fuzzy logic type algorithms: mathematical rules are defined between pressures (relative and absolute values), process gas flows, conductances, and parameters which govern the instantaneous speed profiles.

Figure 5:
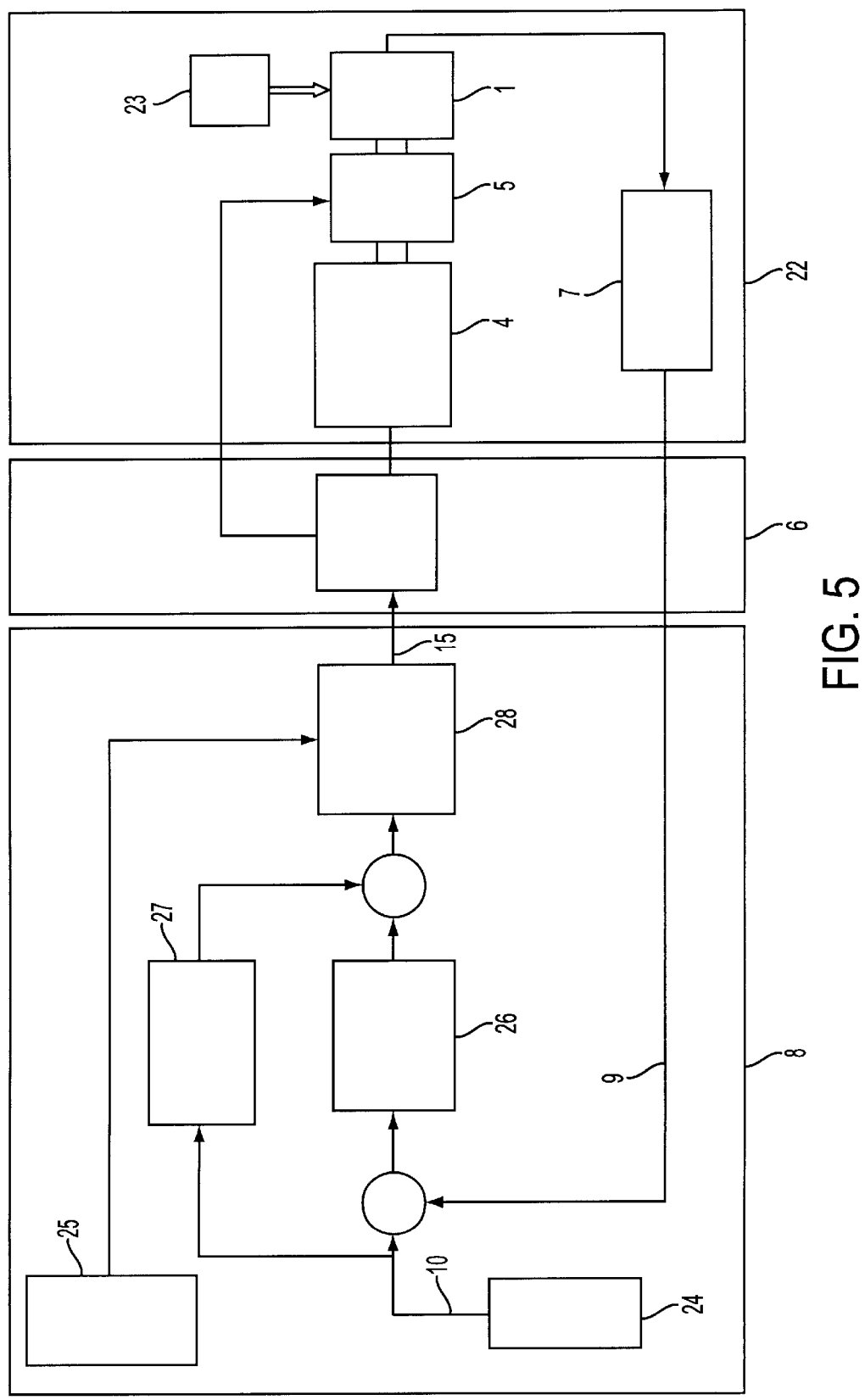
FIG. 5 is a diagram of a system constituting another and advantageous embodiment of the invention.

FIG. 5 shows a particularly advantageous embodiment whereby the invention enables the reaction time of the system to be reduced even further. This figure has a process and vacuum generating assembly 22 including the process chamber 1 connected to the intake of the secondary pump 5 itself connected to the intake of the dry primary pump 4. The secondary pump 5 and the dry primary pump 4 are both powered separately at variable frequencies by the speed controller 6 itself controlled by the observer 8.

In the process implemented within the process chamber, the gas pressure that exists inside the process chamber 1 is monitored, treatment gas is introduced via a gas introduction device 23, and the process is controlled by a controller (not shown) which determines the steps of the process, in particular by fixing a reference pressure 24 and a reference gas flow rate 25. The reference pressure 24 and the reference gas flow rate 25 are sent to the observer 8 which receives other information, in particular information concerning pressure as communicated by the pressure sensor 7 connected to the process chamber 1.

Figure 6:
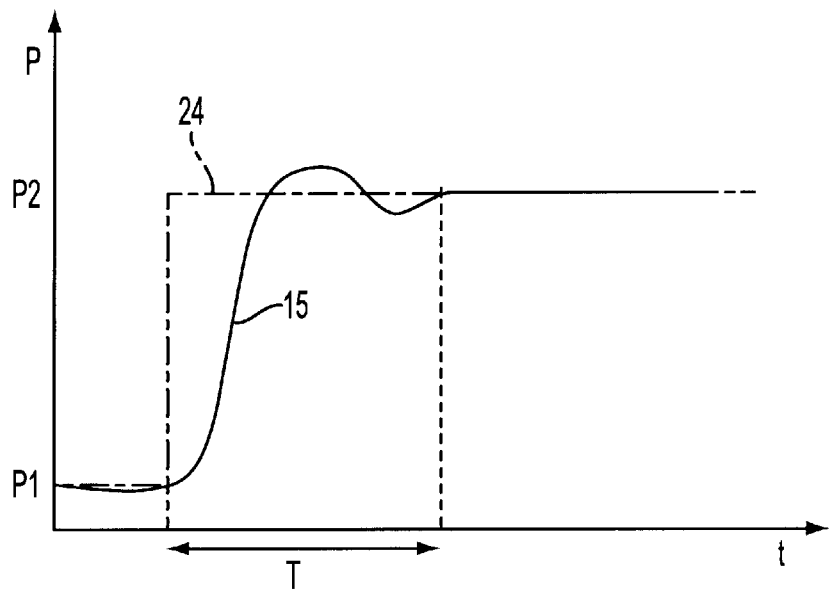
FIG. 6 is a timing diagram showing the reaction speed of the system of the invention.

The observer 8 is programmed in such a manner as to produce a control signal 15 for the speed controller 6 which, on receiving a step in the reference on the pressure reference 24 and/or the gas flow reference 25 (or any other reference for a parameter monitored by the observer 8 such as the radio frequency power in the process chamber 1, for example), presents a reaction time T of less than 5 seconds and an overshoot of less than 5%. This reaction time is illustrated in FIG. 6 where the pressure reference 24 is shown as a chain-dotted line in the form of a step from a pressure P1 of about 1.33 Pa (10 m torr) to a pressure P2 of about 12 Pa (90 m torr), and also the control signal 15 applied to the speed controller which follows the step in the reference 24 quickly and stabilizes after a reaction time T of less than 5 seconds. The invention makes it possible to achieve a reaction time T that is of the order of 1 second, for example.

To achieve such fast reaction times, FIG. 5 shows a possible embodiment of the observer 8: for regulation under steady conditions, the observer 8 acts by means of a program 26 of the continuous proportional and integral numerical controller type in which gain and time constant are adjusted. A bilinear approximation makes it possible to find the recurrence equation of the digital controller 26. This disposition improves the accuracy, speed, and stability of the process.

In response to a step in a reference, the observer 8 acts by means of a program 27 that calculates in an open loop mode, using calculation in the form of a time polynomial which, for linear systems, has the advantage of simplifying calculation. This optimizes variation in the control signal 15 applied to the speed controller 6 as a function of time so as to comply with all constraints during the transition between two successive states of the process in the process chamber 1.

Thus, the observer 8 is programmed so as to operate in open loop mode during the transient stages of the process, and in a closed loop mode during steady conditions of the process.

In the embodiment shown in FIG. 5, the flow rate reference acts on a module 28 for limiting overshoot or undershoot when the pressure reference changes, while maintaining an optimized response time. The module 28 can be programmed to take account of the reaction constants of the vacuum and process generator system 22 as a function of pressures and flow rates given the purge flow rates, the types of pump, the conductances of the system, and the volume of the process chamber 1, in particular.

Whatever the embodiment, the secondary pump which is controlled simultaneously with the primary pump can be implemented as a turbomolecular pump.

The secondary pump, controlled simultaneously with the primary pump can also be a Roots type pump. Under such circumstances, a turbomolecular pump can be interposed between the controlled Roots type secondary pump and the regulated pressure enclosure. The gauges, probes, and sensors can then be positioned either at the intake or at the outlet of the interposed turbomolecular pump.

The invention also relates to vacuum pumping apparatus comprising a pump unit 3 having a dry mechanical primary pump 4 and at least one secondary pump 5, a vacuum enclosure 1, and pipework 2 connecting the vacuum enclosure 1 to the pump unit 3.

It is important for the primary pump 4 to be a dry mechanical pump so as to avoid any pollution of the gas by liquids or oils present in the pump and diffusing back into the gas. As a result, the apparatus of the invention can be applied to manufacturing semiconductors and other micro- or nano-technology devices.

In the invention, the pumping apparatus includes a pressure regulator system as described above.

Naturally, the invention is not limited to the embodiments described, and numerous variants thereof are accessible to the person skilled in the art without departing from the invention.

What is claimed is:

1. A system for controlling the pressure in an enclosure (1) that contains process gas for manufacturing semiconductor components or micro- or nano-technology devices, the enclosure being connected by pipework (2) to a pump unit (3) comprising a dry mechanical primary pump (4) and at least one secondary pump (5), the system comprising a speed controller (6) controlling simultaneously the speeds of rotation both of the dry mechanical primary pump (4) and of said at least one secondary pump (5), wherein the speed controller (6) controls the rotary speed of said pumps according to rotary speed profiles (20) calculated on the basis of condensation curves for the effluents contained in the enclosure (1) and the pipework (2).

2. A system for controlling the pressure in an enclosure (1) that contains process gas for manufacturing semiconductor components or micro- or nano-technology devices, the enclosure being connected by pipework (2) to a pump unit (3) comprising a dry mechanical primary pump (4) and at least one secondary pump (5), the system comprising a speed controller (6) controlling simultaneously the speeds of rotation both of the dry mechanical primary pump (4) and of said at least one secondary pump (5), wherein the speed controller (6) controls the rotary speed profiles (20) for the pumps according to rotary speed profiles (20), calculated on the basis of aerodynamic characteristics for non-turbulent flow of the effluents in the enclosure (1) and the pipework (2).

3. A system according to claim 2, characterized in that it comprises a pressure gauge (7) delivering a input value (9) and mounted upstream from the controlled secondary pump (5) to monitor pressure, and an observer (8) having an input that receives said input value (9) from the pressure gauge (7) and having an input that receives an input value (10) from a variable reference pressure (17), wherein the observer outputs a control signal (15) to the speed controller (6), and said speed controller increases or decreases the speeds of rotation of the pumps (4, 5) as a function of said control signal (15).

4. A system according to claim 3, characterized in that it comprises a pressure gauge (7') mounted upstream from the controlled dry primary pump (4) to monitor pressure, the observer (8) receiving an input value (9') proportional to the monitored pressure.

5. A system according to claim 3, characterized in that it comprises a temperature probe (11) mounted upstream from the controlled secondary pump (5) to monitor temperature, the observer (8) having an input value (12) proportional to the monitored temperature.

6. A system according to claims 3, characterized in that it comprises a turbulence sensor (13) mounted upstream from the controlled secondary pump (5) to deliver a signal proportional to a degree of turbulence, the observer (8) having an input value (14) receiving said signal proportional to the degree of turbulence.

7. A system according to claim 3, characterized in that it comprises a particle sensor (18) mounted upstream and/or downstream from the controlled secondary pump to measure the level of particles, the observer (8) having an input value (19) proportional to the number of particles in the pipework.

8. A system according to claim 3, characterized in that the observer (8) receives references (24,25) and includes a program which produces a control signal (15) for the speed controller (6) that presents a reaction time (T) of less than 5 seconds and an overshoot of less than 5% when receiving a step in a reference (24, 25) during the treatment of semiconductors or of micro- or nano-technology devices in the enclosure (1).

9. A system according to claim 8, characterized in that the observer (8) includes a program which operates in an open loop mode during transient stages of the process and which operates in a closed loop mode during steady conditions of the process.

10. Pumping apparatus comprising a pump unit (3) having a dry mechanical primary pump (4) and at least one secondary pump (5), an enclosure (1), and pipework (2) connecting the enclosure (1) to the pump unit (3), the apparatus being characterized in that it comprises a pressure regulator system according to claim 4.

11. Pumping apparatus according to claim 10, characterized in that the at least one secondary pump (5), simultaneously with, the dry mechanical primary pump (4), is a turbomolecular pump.

12. Pumping apparatus according to claim 10, characterized in that the at least one secondary pump (5), controlled simultaneously with the dry mechanical primary pump (4), is a Roots type pump.

13. Pumping apparatus according to claim 12, characterized in that it comprises a turbomolecular pump between the Roots type controlled secondary pump (5) and the vacuum enclosure (1).

14. A pumping apparatus comprising:

a dry mechanical pump primary pump (4);

at least one secondary pump (5);

an enclosure (1) that contains process gas for manufacturing semiconductor components or micro- or nano-technology devices, and pipework (2) connecting the enclosure (1) to the secondary pump (5), a pressure controlling system, having a speed controller (6) controlling simultaneously the speeds of rotation both of the dry mechanical primary pump (4) and of said at least one secondary pump.

15. A system according to claim 1, characterized in that it comprises a pressure gauge (7) delivering a input value (9) and mounted upstream from the controlled secondary pump (5) to monitor pressure, and an observer (8) having an input that receives said input value (9) from the pressure gauge (7) and having an input that receives an input value (10) from a variable reference pressure (17), wherein the observer outputs a control signal (15) to the speed controller (6), and said speed controller increases or decreases the speeds of rotation of the pumps (4, 5) as a function of said control signal (15).

16. A system according to claim 15, characterized in that it comprises a pressure gauge (7) mounted upstream from the controlled dry primary pump (4) to monitor pressure, the observer (8) receiving an input value (9') proportional to the monitored pressure.

17. A system according to claim 15, characterized in that it comprises a temperature probe (11) mounted upstream from the controlled secondary pump (5) to monitor temperature, the observer (8) having an input value (12) proportional to the monitored temperature.

18. A system according to claims 15, characterized in that it comprises a turbulence sensor (13) mounted upstream from the controlled secondary pump (5) to deliver a signal proportional to a degree of turbulence, the observer (8) having an input value (14) receiving said signal proportional to the degree of turbulence.

19. A system according claim 15, characterized in that it comprises a particle sensor (18) mounted upstream and/or downstream from the controlled secondary pump to measure the level of particles, the observer (8) having an input value (19) proportional to the number of particles in the pipework.

20. A system according to claim 15, characterized in that the observer (8) receives references (24,25) and includes a program which produces a control signal (15) for the speed controller (6) that presents a reaction time (T) of less than 5 seconds and an overshoot of less than 5% when receiving a step in a reference (24, 25) during the treatment of semiconductors or of micro- or nano-technology devices in the enclosure (1).

21. A system according to claim 20, characterized in that the observer (8) includes a program which operates in an open loop mode during transient stages of the process and which operates in a closed loop mode during steady conditions of the process.

22. Pumping apparatus comprising a pump unit (3) having a dry mechanical primary pump (4) and at least one secondary pump (5), an enclosure (1), and pipework (2) connecting the enclosure (1) to the pump unit (3), the apparatus being characterized in that it comprises a pressure regulator system according to claim 15.

23. Pumping apparatus according to claim 22, characterized in that the at least one secondary pump (5), simultaneously with, the dry mechanical primary pump (4), is a turbomolecular pump.

24. Pumping apparatus according to claim 22, characterized in that the at least one secondary pump (5), controlled simultaneously with the dry mechanical primary pump (4), is a Roots type pump.

25. Pumping apparatus according to claim 23, characterized in that it comprises a turbomolecular pump between the Roots type controlled secondary pump (5) and the vacuum enclosure (1).

* * * * *